United States Patent
Hribernig et al.

(10) Patent No.: US 6,668,072 B1
(45) Date of Patent: Dec. 23, 2003

(54) METHOD FOR PRODUCING A REFERENCE IMAGE FOR PATTERN RECOGNITION TASKS

(75) Inventors: Gerd Hribernig, Graz (AT); Wolfgang Marius, Graz (AT); Christofer Hierold, München (DE); Thomas Scheiter, Oberhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/708,296

(22) Filed: Nov. 8, 2000

Related U.S. Application Data

(63) Continuation of application No. PCT/DE99/01303, filed on May 3, 1999.

(30) Foreign Application Priority Data

May 8, 1998 (AT) .................................. 782/98

(51) Int. Cl.⁷ .............................. G06K 9/36; G06K 9/32
(52) U.S. Cl. ................... 382/124; 382/284; 382/294; 382/295; 382/296
(58) Field of Search ............... 382/124, 125, 382/126, 127, 284, 294, 295, 296

(56) References Cited

U.S. PATENT DOCUMENTS

| | | | | |
|---|---|---|---|---|
| 4,933,976 A | * | 6/1990 | Fishbine et al. ............ | 382/127 |
| 5,649,032 A | * | 7/1997 | Burt et al. .................. | 348/588 |
| 5,838,837 A | * | 11/1998 | Hirosawa et al. ........... | 358/450 |
| 6,011,558 A | * | 1/2000 | Hsieh et al. ................ | 345/421 |
| 6,075,905 A | * | 6/2000 | Herman et al. ............. | 348/588 |
| 6,157,747 A | * | 12/2000 | Szeliski et al. ............. | 345/419 |
| 6,178,255 B1 | * | 1/2001 | Scott et al. ................. | 356/71 |
| 6,292,593 B1 | * | 9/2001 | Nako et al. ................. | 382/284 |

FOREIGN PATENT DOCUMENTS

WO    WO 98/02844    * 1/1998

OTHER PUBLICATIONS

Zheng et al. "A Computational Vision Approach to Image Registration." IEEE Trans. on Image Processing, vol. 2, No. 3, Jul. 1993, pp. 311–326.*

Kurosu et al. "A Study on Assembling of Subpictures with Visual Servo." Proc. IEEE IECON, 22$^{nd}$ Int. conf. on Industrial Electronics, Control, and Instrumentation, vol. 2, Aug. 1996, pp. 864–869.*

* cited by examiner

*Primary Examiner*—Jon Chang
(74) *Attorney, Agent, or Firm*—Laurence A. Greenberg; Werner H. Stemer; Gregory L. Mayback

(57) ABSTRACT

A reference image for pattern recognition tasks is produced. Overlapping individual images are combined to form an overall image and the overall image is used as the reference image. This allows the size of reference images for fingerprints, for instance, which has hitherto been governed by the sensor area, to be increased. The recognition rate can thus be improved.

3 Claims, 3 Drawing Sheets

METHOD FOR PRODUCING A REFERENCE IMAGE FOR PATTERN RECOGNITION TASKS

CROSS-REFERENCE TO RELATED APPLICATION

This is a continuation of copending international application PCT/DE99/01303, filed May 3, 1999, which designated the United States.

BACKGROUND OF THE INVENTION

Field of the Invention

The invention relates to a method for producing a reference image for pattern recognition tasks.

Pattern recognition tasks are becoming increasingly important. They play a role in conjunction with industrial robots for highly automated production tasks, and in particular for automatic identification of personnel. The fields of use in that case include, inter alia, access monitoring, automatic teller machines with cash dispensers, and all types of communications equipment.

Suitable personal features, i.e., biometric features for identification include, for example, the pattern of the blood vessels in the retina, the structure of the iris, the length and shape of the fingers, the face, the voice, or else fingerprints. The options for identifying persons on the basis of these features are described, for example, in IEEE Spectrum, February 1994, "It had to be you". Fingerprints are thereby probably the best researched, and thus most reliable, features. They can also be determined in a manner which is convenient for the user while, for example, the pattern of the retina can be recorded only by using a procedure which is unpleasant for the person being identified, and which can thus be used only in those cases in which this effect is irrelevant, or is even desirable.

The uniqueness and individuality of fingerprints has been verified by careful series of experiments and statistics; it is thus certain that each person's fingerprints are individually specific. Even in cases of identical twins, the fingerprints are not identical, although they appear to be very similar. The pattern of the fingerprints is formed by the so-called papillary lines or ridges which are produced by the interlocking of two layers of skin.

In this case, the so-called minutiae are primarily of interest for the identification process, these being end points, branches, islands or other singularities. The fingerprint to be identified is thus investigated to determine which minutiae it has, the minutiae which have been determined are allocated to a type, and their position and orientation with respect to one another are established.

The minutiae obtained in this way describe the fingerprint completely. They are used as the basis for comparing the fingerprint to be identified with stored reference patterns.

The matching probability of the recognition process depends entirely on the quality of these reference patterns.

A secondary aspect of quality is in this case the size of the reference image.

In order to produce a reference image which is as large as possible, it has become known from U.S. Pat. No. 4,933,976 for a sequence of overlapping individual images to be recorded from a finger while it is being rolled over a conventional prismatic assembly and for these individual images then to be joined together for a larger overall image. In that process, it is assumed that the individual images have only been linearly displaced with respect to one another, and not rotated.

According to the disclosure in the international publication WO 98/02844, the compilation of a mosaic-like image from individual images is known for general image processing applications.

SUMMARY OF THE INVENTION

The object of the invention is to provide a method of producing a reference image for pattern recognition which overcomes the above-noted deficiencies and disadvantages of the prior art devices and methods of this kind, and which allows high quality reference patterns to be produced to form images from which symbolic line formation can be obtained in a stable and reproducible manner.

With the above and other objects in view there is provided, in accordance with the invention, a method of producing a reference image for pattern recognition tasks, which comprising the following method steps:

recording a plurality of at least partially overlapping images of a pattern to be recognized;

producing a symbolic intermediate representation for each of the images by digitizing and establishing probable lines or shapes;

comparing the symbolic intermediate representations of two images with one another, and determining a relative shift and rotation of the images with respect to one another;

transforming the two intermediate representations coincide in an overlapping area and determining a quality of the match;

if the quality of the match is adequate, synthesizing the two intermediate representations to form an overall image;

comparing the overall image with a respective further intermediate representation and producing from this a further overall image, until an overall image is obtained which comprises all the intermediate representations with a useable matching level, and which is used as a reference image.

In other words, the objects of the invention are satisfied with the novel method for producing a reference image for pattern recognition tasks, comprising the following method steps:

a number of at least partially overlapping images of the pattern which is to be recognized is recorded, a symbolic intermediate representation is produced for each of the recorded images, the symbolic intermediate representations of two images are compared with one another, and the relative shift and rotation of the images with respect to one another are determined, transformation is used to make the two intermediate representations coincide in the overlapping area and to determine the quality of the match, if the quality of the match is adequate, the two intermediate representations are synthesized to form an overall image, the overall image is compared with in each case one further intermediate representation and a further overall image is produced from this until, in the end, an overall image is obtained which comprises all the intermediate representations with a useable matching level, and which is used as a reference image.

The probability of the area of the image in question being contained completely in the "virtual" area of the reference can thus be made as high as desired.

The quality of the features which are located in regions of the reference image which have been recorded more than once is considerably increased by averaging.

The invention can be used particularly advantageously if the pattern to be recognized is a fingerprint.

The process for adding to and improving the reference image can also be continued in the course of the recognition processes by adding each recognized fingerprint—each recognized pattern–to the reference image, thus increasing the quality of the reference. Furthermore, in this way, limited changes such as minor injuries in the area of the fingerprint, are recorded and taken into account.

Other features which are considered as characteristic for the invention are set forth in the appended claims.

Although the invention is illustrated and described herein as embodied in a method for producing a reference image for pattern recognition tasks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
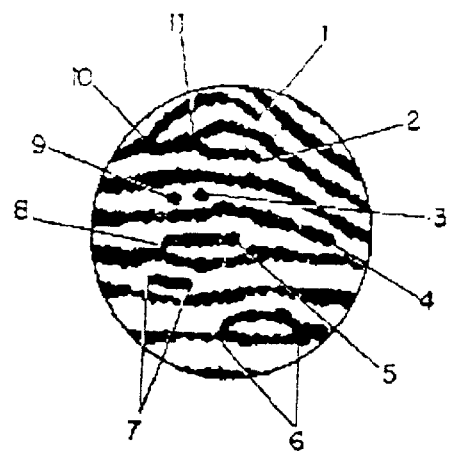
FIG. 1 is a plan view of a pattern of a fingerprint.
Figure 2:
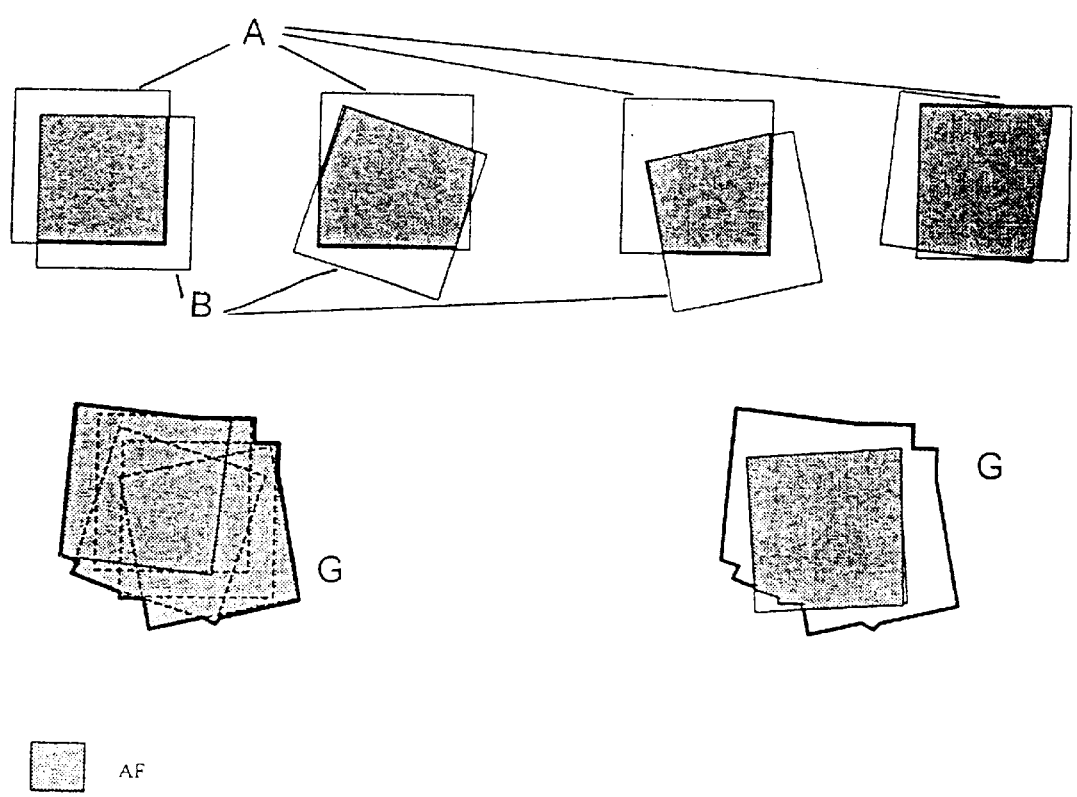
FIG. 2 is a basic illustration of the synthesis process.

Referring now to the figures of the drawing in detail and first, particularly, to FIG. 1 thereof, the dark lines in the image correspond to the finger lines or papillary lines whose profile defines the fingerprint. However, the entire pattern is not used for automatic classification of a fingerprint, since distortion can occur in this overview pattern as a result of the recording technique, the recording pressure and aging of the person in question. The recognition process is, in fact, based on the nature and number of the minutiae contained in this print, such as the finger line ends 1, 2, 4, 5, the points 3, 9, the islands 6, the short lines 7, and the forks 8, 10, 11.

The type, position and orientation of these minutiae are, on the other hand, relatively insensitive to the distortion, and are thus suitable for an automated recognition process.

In this process, the digitized fingerprint image, that is to say the image which is in the form of gray-level information relating to individual pixels, is digitized in a first step, with each pixel being assigned the level black or white.

Line segments, which are distinguished by optimum characteristics for further processing, are generated from the binary image by thinning—line extraction—using a method which is known from the pertinent literature (for example R. W. Zhou et al. Patt. Rec. Lett. 16(1995) 1267-75). Digitization and line extraction are carried out both for the positive image data and for the inverted image data since, by investigating the inverted image data, the independent information contained in the spaces in between the finger lines can be used for line synthesis.

Line extraction results in two sets of line data, one of which describes the finger lines and the other describes the spaces in between the finger lines, Owing to the image recording technique, interference and special features of the digitization process, such line data contain plausible and artificial line segments, that is to say line segments produced by the abovementioned method steps, and these line segments differ and must be synthesized to form finger lines.

The following rules are used to establish the probable finger lines from the line segments:

long finger lines are more trustworthy than short ones;

a the trustworthiness of a finger line is increased by the presence of parallel finger lines at a typical distance or by the presence of finger line valleys at half that distance;

short finger lines, which are at right angles to long finger lines, lose credibility; and finger lines whose ends approach one another are connected to one another.

This establishment process results in a list of features (minutiae) and, for each feature, details of the type, position, line width, orientation, and quality measure which is determined from the number of rules used in the establishment process.

The features are classified by means of a neural network. For this purpose, the value of the individual pixels—typically approximately 176, is applied to the inputs of a "feed forward neural network" (see, "Parallel Distributed Processing", Rumelhart et al., MIT Press 1986), with the pixels being combined to form an input vector I for the formal description. The neural network uses this to calculate an output vector O over an intermediate layer. The output vector O in the exemplary embodiment comprises five elements, which cover the five basic types of features in a fingerprint. These are: "white fork to the right, white fork to the left, ridge (line), black fork to the right, black fork to the left."

"White fork to the right or left" describes branching of the spaces in between the finger lines with rough details of the orientation. "Black fork to the right or left" corresponds to branching of the finger line.

A ridge (line) does not describe a feature, but leads to the network having an increased recognition quality since this improves the capability to distinguish between simple (uninteresting) lines and minutiae.

Before this neural network can be used for classification, it must be trained. This is done using the "error back propagation algorithm" (see, "Parallel Distributed Processing", Rumelhart et al., MIT Press 1986).

In this case, patterns having a predetermined classification are fed into the neural network, which iteratively learns the relationship between the pattern and the classification.

The neural network which has been trained in this way forms an output vector for each image detail applied to it, comprising the values of the five output neurons. The ratio between these values defines the type and the quality of the original pattern.

If the value of an output neuron is thereby very high in comparison to the other values, then a very high quality result has been obtained and the corresponding feature was thus clearly associated with the basic type which is defined by this output neuron. If, however, all the output neurons have approximately the same value, then it has not been possible for the neural network to assign the original image to any feature type.

The result of the recognition process is largely independent of the position of the feature in the image detail under consideration. This intrinsically advantageous characteristic of neural networks means, however, that the position of a feature cannot be established directly, since the neural network comes to virtually the same conclusion for overlapping image details which admittedly contain the same feature, but at different points.

Thus, in order to determine the exact position of a feature, the results are compared with one another for assessment of overlapping image details and the location of the feature is selected as being the center of the image detail whose assessment by the neural network results in a maximum.

This maximum may be determined, for example, by counting the results of the neural network to form surrounding, overlapping image details around the image detail under consideration. If the sum of the results in the surrounding area is a maximum in comparison to the sums in the surrounding area of the adjacent image details, then the center of this image detail is defined as the clear position of the feature.

As an alternative to this, it is also possible to use the quality of the results from adjacent overlapping image details to determine the exact position of features.

These quality results are regarded as a scalar field, and a global maximum is established. The location of the maximum is defined as the position of the feature.

The results from the neural network, that is to say the confirmed minutiae, are compared with feature lists for known fingerprints, so-called candidates.

To this end, connecting vectors are formed between the minutiae of the fingerprint to be identified, that is to say the trace in criminal-investigation specialists jargon, and the identical minutiae in the candidate respectively being considered. The set of these connecting vectors is then constrained by a tolerance band, which is placed around each of the minutiae of the trace in the same way: all the connecting vectors which do not end within the associated tolerance band on one of the candidate minutiae are rejected.

The remaining connecting vectors are entered in a two-dimensional vector space for assessment of the match between the two prints, with each connecting vector being represented as a point with length and orientation coordinates.

Similar connecting vectors thus result in the accumulation of points at the appropriate location in the vector space. This forms a so-called cluster.

If a pronounced cluster can be found, then the trace and the candidate can be regarded as being similar.

The quality of the similarity between the two fingerprints is in this case described by the sum total of the connecting vectors, their ratio to the maximum possible number, the number of connecting vectors located outside the cluster, and the density of the minutiae recorded.

Thus, two fingerprints are, for example, regarded as being similar or as having a high probability of being a match, if connecting vectors exist for at least 75% of the minutiae and if at least 80% of these minutiae lie within a predetermined tolerance band in the vector space.

If, on the other hand, connecting vectors have been determined for only a small proportion of the minutiae since no identical minutiae for the candidate have been found within the respectively predetermined tolerance bands, then no match exists. This lack of any match also occurs if, although connecting vectors are found, the majority of them have different lengths or orientations, and thus do not form any clusters in vector space.

Depending on the application, a list of the best matching candidates (for example in a criminal investigation) or else—if it exists—an individual match (for example for access monitoring systems) is output.

That candidate which has the best ratio of identical vectors to minutiae is then defined as the matching fingerprint. However, this is only the case if the result for this candidate differs significantly from the results for the other candidates.

An essential precondition for a successful recognition process is in this case a high-quality reference image (candidate). This reference image is obtained using the same methods as the fingerprint to be identified, and it is also used as the basis for a feature list which describes the fingerprint.

If possible, the reference image should cover the entire fingerprint and should therefore include all the features which are relevant for the recognition process. However, this is not the case when using commercially available fingerprint sensors with a comparatively small sensor area, unless the finger is placed exactly centrally on the sensor during the initialization process. The effective sensor area is thus reduced, and the recognition process made more difficult.

Thus, in known methods, that area of a reference image which can be evaluated is determined and, if this is smaller than a predetermined value, the image is not considered.

According to the invention, a number of partially overlapping images B are now joined together to form a reference image G which covers a larger area than the sensor area. This results in the following advantages:

The probability that the area of the image in question is included completely in the "virtual" area of the reference can thus be made as high as desired.

The quality of the features which are located in regions of the reference image G that are recorded more than once is increased considerably by averaging.

The method presupposes that symbolic line information K1a, K1b, K2a, K2b, LA, LB can be obtained in a stable and reproducible manner from the images. This is the case, for example, when the images relate to plan drawings, fingerprints or the outlines of machine parts.

During the synthesis process of two overlapping images B to form a new reference image G, symbolic intermediate representations of the images are first of all produced in a known manner—by digitization and establishment of probable lines or forms.

After this, the relative position displacement and rotation of the images with respect to one another are established and are compensated for by appropriate transformation of one of the images.

Figure 3:
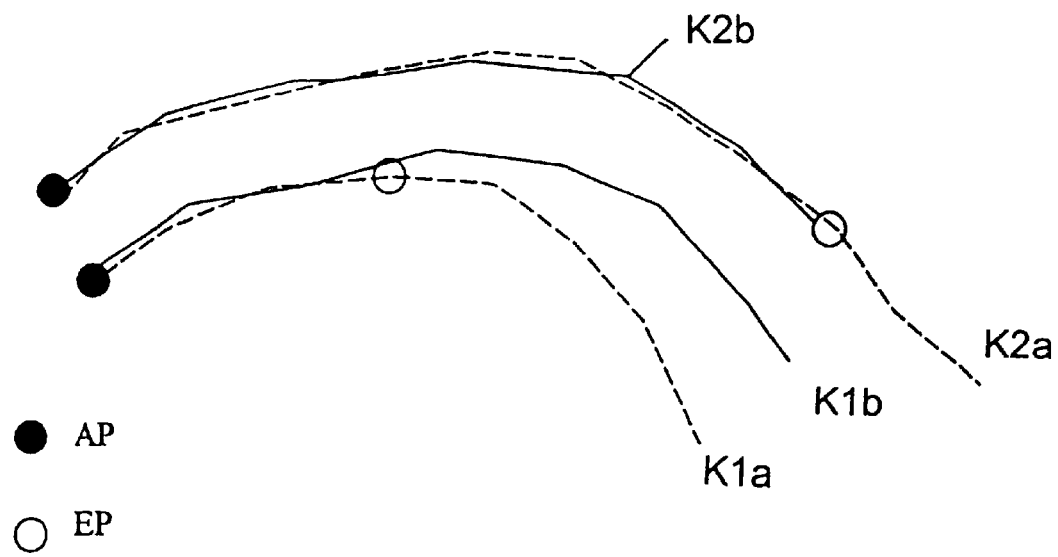
FIG. 3 is a diagrammatic illustration relating to the assessment of the quality of the match between the intermediate representations.
Figure 4:
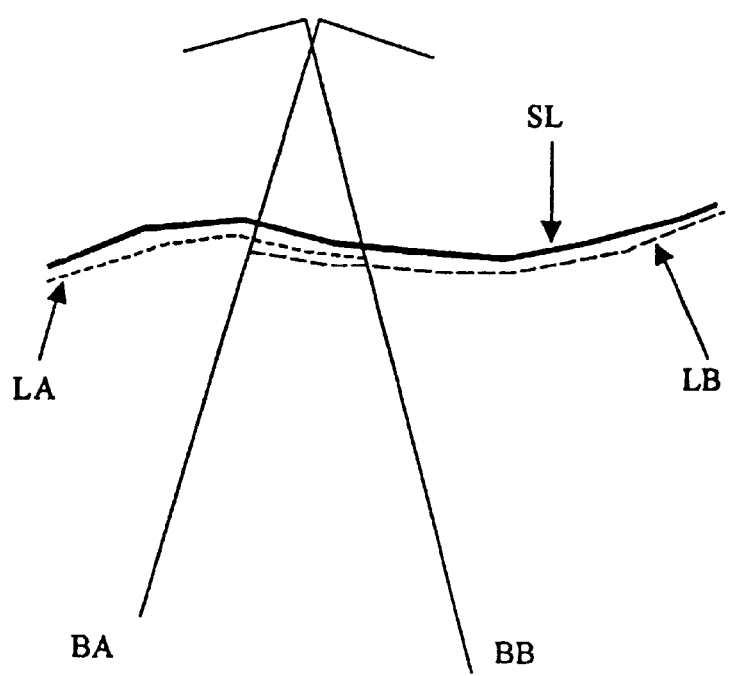
FIG. 4 is an illustration relating to the synthesis of an overall image.
Figure 5:
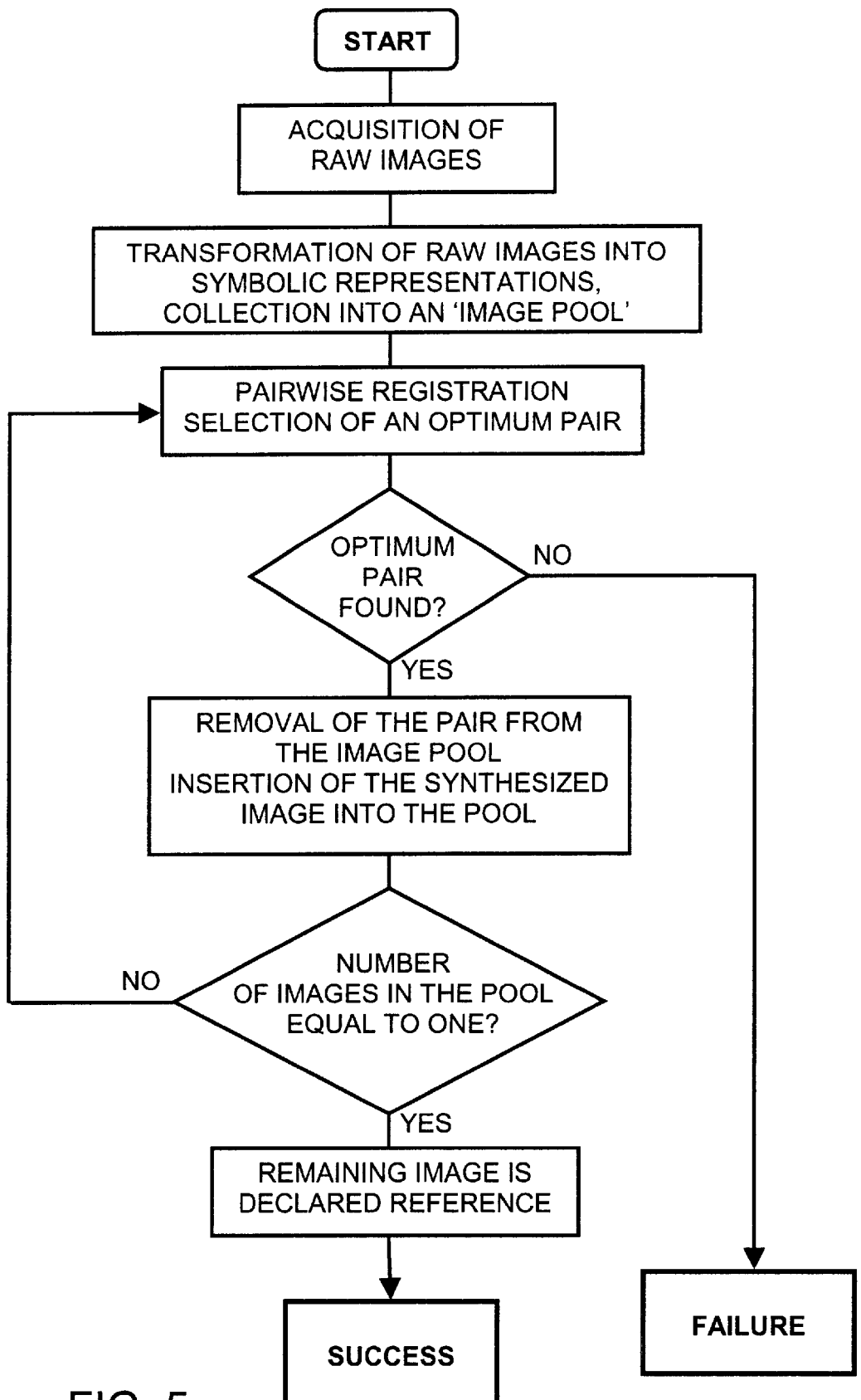
FIG. 5 is a flowchart outlining the method according to the invention.

The quality of the match between the intermediate representations is then assessed as follows:

Corresponding pairs of points are looked for on the basis of pronounced points on the lines (branch points and end points) found in the two representations. Corresponding curves K1a and K1b, and K2a and K2b, which originate from these points AP, are traced with the same step width in both representations until one of the following criteria is satisfied:

the end points EP of both curves are reached within a tolerance window;

one of the two curves reaches the edge of the image; and no point which is within a predefined limit away from the first point can be found with respect to a first point on a line K1a, K2a within half the step width on the corresponding curve K1b, K2b (FIG. 3).

The overall length of the curve segments K1a and K1b, and K2a and K2b, which have thus been made to coincide, is regarded as a measure of the match between the two symbolic representations.

If the measure of the match exceeds a predetermined value, the two representations BA, BB, LA, LB are joined to form an overall image SL, which are compared in the described manner with further intermediate representations, and are joined together to form further overall images.

The process for adding to and improving the reference image can also be continued in the course of the recognition processes by adding each recognized fingerprint—each recognized pattern—to the reference image. This improves the quality of the reference. Furthermore, limited changes, such as minor injuries in the area of the fingerprint, are in this way recorded and taken into account.

A synthetic reference G, which overcomes the area limitation of the original reference, can be produced from a number of images B which have been recognized on the basis of this criterion in the reference image.

We claim:

1. A method of producing a reference image for pattern recognition tasks, which comprises the following method steps:

recording a plurality of at least partially overlapping images of a pattern to be recognized;

producing a symbolic intermediate representation for each of the images by digitizing and establishing probable lines or shapes;

comparing the symbolic intermediate representations of two images with one another, and determining a relative shift and rotation of the images with respect to one another;

transforming the two intermediate representations to coincide in an overlapping area and determining a quality of a match;

if the quality of the match is adequate, synthesizing the two intermediate representations to form an overall image;

comparing the overall image with a respective further intermediate representation and producing from this a further overall image, until an overall image is obtained which comprises all the intermediate representations with a useable matching level, and which is used as a reference image.

2. The method according to claim 1, wherein the pattern to be recognized is a fingerprint.

3. The method according to claim 1, which comprises at least partially producing the reference image concurrently with recording the pattern to be recognized.

* * * * *